April 12, 1932.   F. J. HOUCK   1,853,356
TOOL FOR INSERTING VALVE STEMS IN INNER TUBES
Filed May 14, 1929
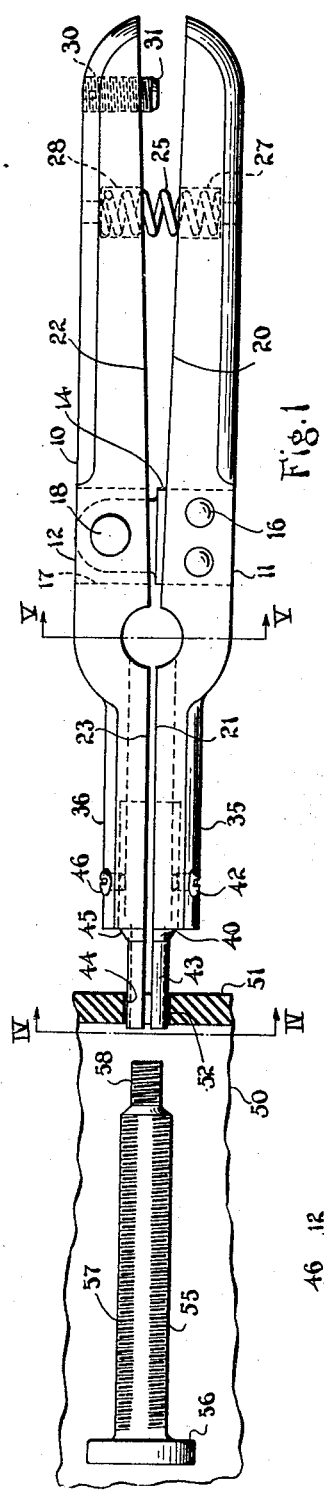
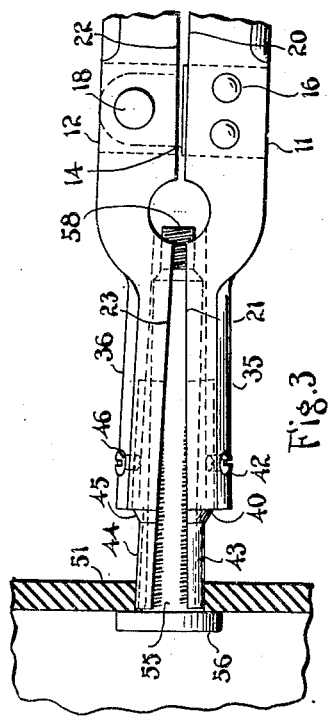
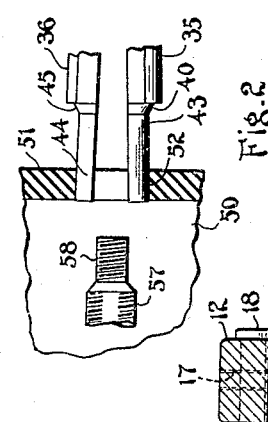
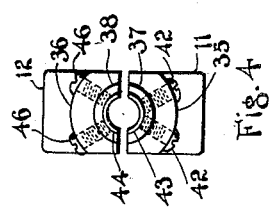
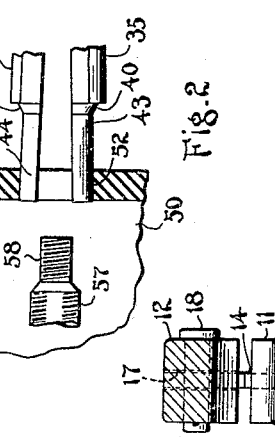
Inventor
Frank J. Houck
By
Attorney Patented Apr. 12, 1932

1,853,356

UNITED STATES PATENT OFFICE

FRANK J. HOUCK, OF AKRON, OHIO, ASSIGNOR TO THE GOODYEAR TIRE & RUBBER COMPANY, OF AKRON, OHIO, A CORPORATION OF OHIO

TOOL FOR INSERTING VALVE STEMS IN INNER TUBES

Application filed May 14, 1929. Serial No. 363,062.

This invention relates to the manufacture of inner tubes for pneumatic tires and it has particular relation to a device for facilitating the insertion of valve stems through openings provided in the inner tubes.

The object of the invention is to provide a tool for facilitating the insertion of valve stems in inner tubes, which is so operable that, during the inserting operation, the threads on the valve stems are prevented from engaging and damaging the edges of the openings in the tubes.

Ordinarily a valve stem is inserted in an opening provided therefor in an inner tube by first inserting it within the tube and then projecting its threaded or outer end through the opening until the head on the inner end of the stem engages the inner surface of the tube adjacent the opening. In the event that the inner tube is vulcanized prior to insertion of the valve stem through the opening therefor, it is not likely that the threads on the stem will injure the edges of the opening because the rubber, owing to the fact that it is vulcanized, is sufficiently durable to prevent any damage by the threads on the valve stem engaging it.

When the later method of extruding inner tubes from uncured rubber came into practice, it was necessary to insert the valve stem prior to vulcanization of the tube because the latter was inflated during the vulcanizing operation. However, it was soon apparent that the threads of the valve stem frayed the edges of the opening in the inner tube because the rubber comprising the latter was soft and not very elastic. Moreover, portions of the rubber surrounding the opening frequently were pushed outwardly by the threads. This caused a lack of uniform engagement of the inner tube by the head on the inner end of the valve stem and a bridge plate on the stem disposed on the outer side of the tube. Consequently, the inner tube, when inflated, leaked adjacent the valve stem.

According to this invention, a tool is provided for inserting valve stems in the openings provided therefor in inner tubes and comprises a pair of elongate members pivotally connected intermediate their ends. On one side of the pivot the ends of these members have semi-cylindrical bushings secured to each other respectively, which conjointly form a split cylinder when these ends of the members are disposed closely adjacent. When so disposed, the semi-cylindrical ends conjointly project easily through the valve stem opening in the inner tube. The semi-cylindrical ends then are expanded by movement of the members relatively about their pivot and the opening in the tube correspondingly enlarged. Thereafter, the threaded end of the valve stem is inserted through the valve stem opening between the expanded ends of the tool until the head on the inner end of the stem is properly seated against the inner surface of the tube. The tool then may be removed leaving the edges of the opening in the tube undamaged.

For a better understanding of the invention, reference may now be had to the accompanying drawings, forming a part of the specification, in which:

Fig. 1 is a view of a tool constructed according to one form of the invention illustrating it with its operative end projected through the valve stem opening in the inner tube, prior to the insertion of the valve stem through such opening;

Fig. 2 is a fragmentary view illustrating the tool in operative position with respect to the wall of an inner tube;

Fig. 3 is a fragmentary view illustrating the tool in its position shown by Fig. 2 and the valve stem projected into its operative position;

Fig. 4 is an end view of the tool taken substantially along the line IV—IV of Fig. 1; and Fig. 5 is a cross-sectional view taken substantially along the line V—V of Fig. 1.

Referring to Figs. 1 and 5, a valve stem inserting tool 10 comprises elongate members 11 and 12 pivotally connected intermediate their ends by means of a plate 14 disposed in a slot 15 in the member 11 intermediate the ends of the latter and which is riveted thereto as indicated at 16. This plate 14 likewise projects into a slot 17 in the member 12 and is pivoted to the latter by a pin 18 projecting through it and said member. In order to permit pivotal movement of the members 11 and 12, one side of the member 11 is formed by two surfaces 20 and 21, which converge adjacent the plate 14 and form an included angle of less than 180°. Similarly, the side of the member 12 adjacent the member 11 is formed of two converging surfaces 22 and 23 forming an included angle of less than 180°. It follows that when the surfaces 21 and 23 are diposed parallel, the surfaces 20 and 22 will be directed in diverging relation. Normally, the surfaces 20 and 22 are maintained in diverging relation by a spring 25 having its ends disposed in openings 27 and 28 formed in the adjacent sides of the members 11 and 12 near the outer ends thereof. Movement of these ends of the members 11 and 12 toward each other is limited by an adjustable set screw 30 threaded into the end of the member 12 adjacent the spring 25 and having an end 31 adapted to engage the surface 20.

The ends of the members 11 and 12 opposite the set screw 30 converge into semi-cylindrical portions 35 and 36 respectively. Also the surfaces 21 and 23 in the members are formed of semi-cylindrical shape, as indicated at 37 and 38 (Fig. 4). It follows that when the surfaces 21 and 23 are disposed closely adjacent, the ends of the members 11 and 12 including such surfaces are in the form of a longitudinally split cylinder.

A semi-cylindrical bushing 40 is disposed between the ends of the portions 35 and 36 against the surface 37 and is secured to the portion 35 by screws 42 projecting through the latter and having threaded engagement with the bushing. This bushing has a reduced semi-cylindrical end 43. Likewise, a semi-cylindrical bushing 45 is disposed between the portions 35 and 36 and is secured against the cylindrical surface 38 by screws 46 projecting through the portion 36 and having screw threaded engagement with the bushing. This bushing is provided with a reduced semi-cylindrical end 44 of the same size as the reduced end 43 of the bushing 40. It is apparent by reason of the fact that the bushing 45 is removable with respect to the valve inserting tool, that bushings having various sizes of ends projecting from the ends of the tool, may be employed. Consequently, the tool may be employed with various sizes of valve stems.

An inner tube 50, illustrated fragmentarily, has a wall 51 provided with a valve stem receiving opening 52. A valve stem 55 disposed within the tube is provided with an integral inner head 56, a major outer threaded portion 57 and a minor reduced threaded portion 58.

In operation of the tool 10, a valve stem 57 is disposed within the inner tube 50. Thereafter, the semi-cylindrical ends 43 and 44 of the valve inserting tool 10 are projected through the opening 52. The ends of the members 11 and 12 of the tool opposite the portions 35 and 36 then are moved toward each other against the action of the spring 25 until the end 31 of the set screw 30 engages the surface 20 of the member 11. This results in the movement of the semi-cylindrical ends 43 and 44 of the bushings 40 and 45 away from each other and consequently, an enlargement of the opening 52 in the inner tube 50. This movement of the semi-cylindrical portions 43 and 44 of the bushings is sufficient to permit movement of the threaded portions 57 and 58 of the valve stem 55 therebetween and thereafter the threaded portions of the valve stem are moved through the opening 52 in the inner tube until the head 56 on the stem engages the inner wall of the tube adjacent the opening.

Fig. 3 illustrates the position of the valve stem after it has been moved through the opening 52 and between the bushings 40 and 45. Then, the tool 10 is released and moved outwardly from the inner tube until the bushings 43 and 44 are free from engagement with both the inner tube and the valve stem. It is apparent that during this operation, the threads on the major portion 57 of the valve stem 55 do not engage the edges of the opening 52 in the inner tube.

From the foregoing description, it is apparent that a tool has been provided for inserting valve stems into openings provided therefor in inner tubes, the use of which prevents the threads on the valve stems from engaging and damaging edges of the openings in the inner tube. It is evident that this is particularly advantageous where the valve stems are inserted in the openings of inner tubes prior to vulcanization of the latter, because the rubber in the inner tube prior to vulcanization is soft and not highly elastic. It follows that the portions of the inner tubes adjacent the opening will cooperate uniformly with the inner head of the valve stem and the bridge washer disposed on the latter outwardly of the tube. Hence, leaks that formerly occurred in the inner tube adjacent the valve stem will be prevented.

Although I have illustrated but the preferred form of the invention and have described that form in detail, it will be apparent to those skilled in the art that the invention is not so limited but that various modifications may be made therein without departing from the spirit of the invention or from the scope of the appended claims.

What I claim is:

1. A tool for inserting valve stems into inner tubes comprising a pair of elongate members pivotally connected intermediate their ends, the ends on one side of the pivot having their adjacent sides substantially hollow and semi-cylindrical, said hollow semi-cylindrical sides extending in alignment with the elongate members, a pair of substantially semi-cylindrical bushings releasably secured to such adjacent sides, said bushings being axially aligned with the member and having reduced portions projecting beyond the ends of the members.

2. A tool for inserting valve stems into inner tubes comprising a pair of elongate members pivoted intermediate their ends and having adjacent ends movable to and from each other, and semi-cylindrical bushings releasably secured to the adjacent sides of such ends of the members, said bushings being axially aligned with the members and having portions projecting beyond the ends thereof, said bushings and members being formed with a cylindrical axial opening extending substantially their entire length on one side of the pivot whereby the valve stem can be inserted into the hole in the tube with the tool in position.

3. A tool for inserting objects through holes comprising a pair of arms pivotally connected together between their ends so that movement together of the arms on one side of the pivot will cause movement apart of the portion of the arms on the other side of the pivot, the ends of the arms on one side of the pivot, together being formed with a cylindrical bore extending lengthwise of the arms, a pair of cylindrical jaws removably fastened to the arms in the end of the cylindrical bore and in alignment therewith, said jaws being adapted to increase the diameter of a hole upon movement of the arms so that an object can be inserted therethrough, said cylindrical bore and cylindrical jaws allowing the object to be inserted through the hole while the tool is in position.

In witness whereof, I have hereunto signed my name.

Signed at Akron, in the county of Summit and State of Ohio, U. S. A., this 13th day of May, 1929.

FRANK J. HOUCK.